Sept. 1, 1931.  G. C. OAKES  1,821,316
BEATER DRUM MECHANISM FOR SHELLING MAIZE
Filed Aug. 27, 1930  2 Sheets-Sheet 1

INVENTOR
G. C. OAKES
BY
ATTY.

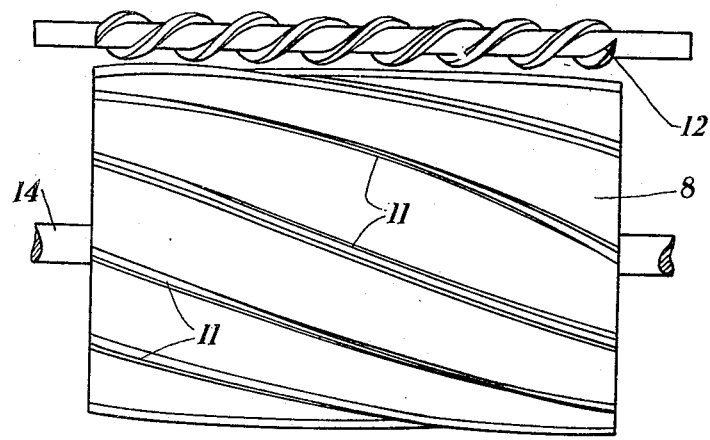
Fig. 4.
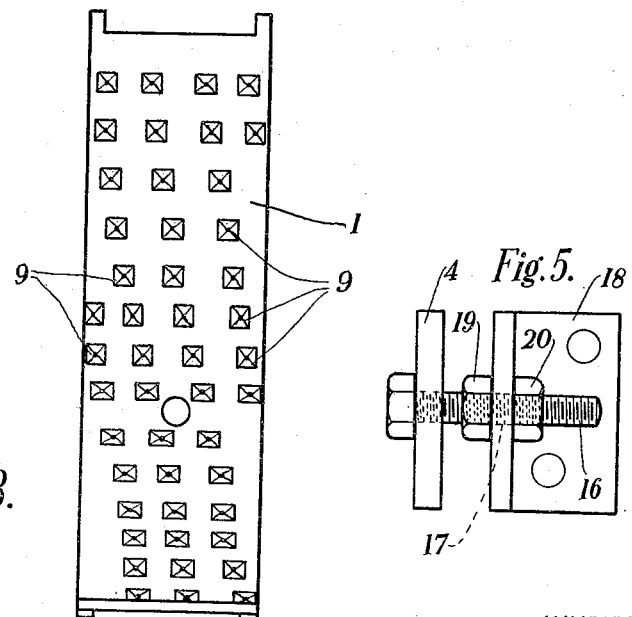
Fig. 3.
Fig. 5.

Patented Sept. 1, 1931

1,821,316

UNITED STATES PATENT OFFICE

GEORGE CLIFTON OAKES, OF NJORO, KENYA COLONY, AFRICA

BEATER DRUM MECHANISM FOR SHELLING MAIZE

Application filed August 27, 1930, Serial No. 478,184, and in Great Britain August 15, 1929.

The invention relates to improvements in beater drum mechanism for shelling maize and for other purposes.

According to the invention the breast for the beater drum is made in sections, each section being adapted to operate independently and preferably under the action of its own spring or springs. The beater drum is preferably provided with beater bars which are of inclined or helical form, particularly when intended for use in shelling maize in the husk, so that the cobs are rolled against the breast sections at a slightly inclined angle ensuring complete shelling of the cobs without undue breakage of the cob cores.

In order to ensure proper and regular feeding of the cobs in that the cobs enter between the breasts and the drum in a favourable position for rolling as just described, a worm is provided along the upper part of the breast in such a position that should a cob tend to enter end first between the breast and drum, it is engaged by the worm and turned over into the correct position, while cobs already in a favourable position pass without interruption.

In the accompanying drawings:

Figure 3 is a front view of one of the sections of the breast.

Figure 4 is a plan of the beater drum and worm.

Figure 5 is a side view of an adjustment for the spring abutment bar for the breast sections.

Figure 2:
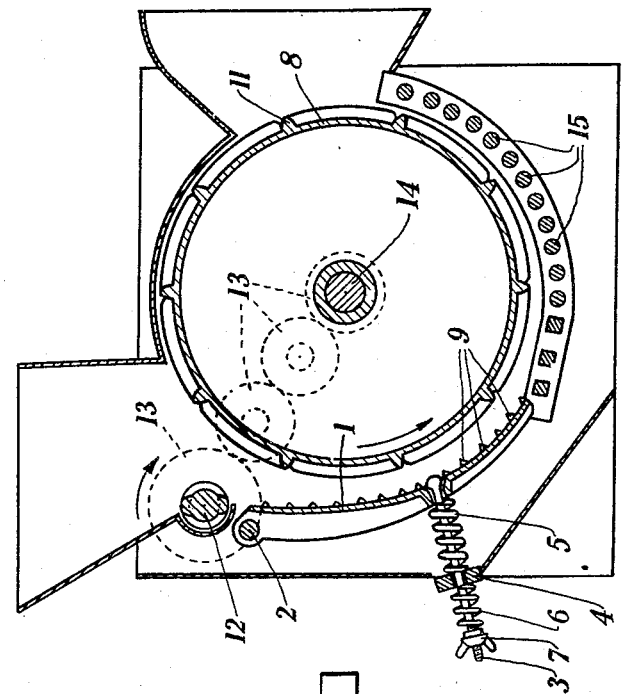
Figure 2 is a side sectional elevation of one form of maize sheller according to the invention.
Figure 1:
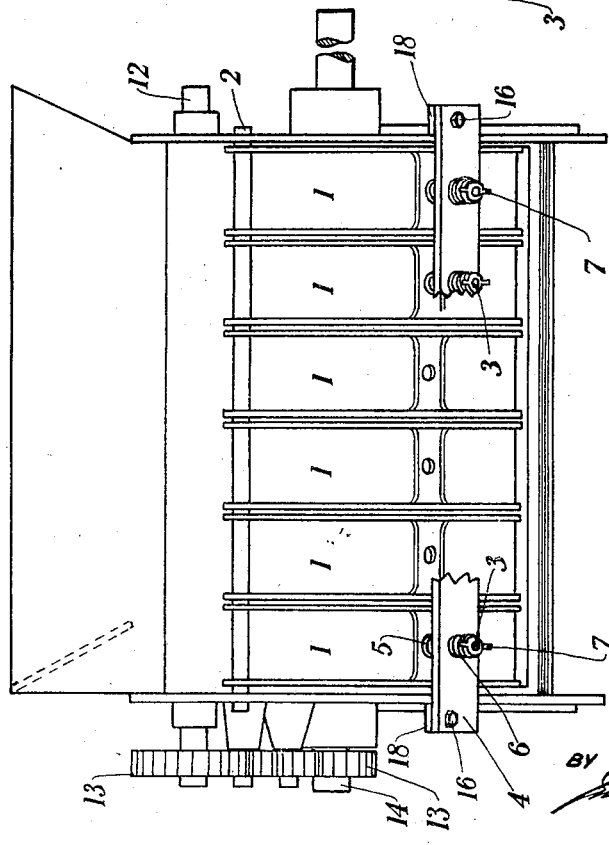
Figure 1 is a rear elevation with a part broken away.

In the form illustrated, 1 are the sections of the breast pivotally mounted so that each is free to move independently about a rod 2 under the control of a bolt 3 which is free to slide through a hole in an abutment bar 4 and is provided with two springs 5 and 6 and a fly nut 7. The stronger spring 5 tends to hold the breast section 1 up to the beater drum 8. The distance which it can approach the beater drum is limited by the spring 6 and nut 7, adjustment of the nut allowing variation in the movement to be determined. The abutment bar 4 is adjustable relatively to the drum 8 so that the breast sections 1 can be set or adjusted initially relatively to the drum, for example the bar 4 has screws 16 which pass freely through holes 17 in brackets 18 but are secured by nuts 19 and 20.

Each breast section 1 has a roughened rubbing surface so as to tear off the husk and then the maize from the cores. It is shown provided with numerous teeth or points 9 for this purpose.

The beater drum 8 shown has beater bars 11 of helical form; it may be a casting with chilled bars 11. 12 is a worm, having a coarse double pitch thread, which is rotated, for example, by a train of gearing 13 off the beater drum shaft 14.

The worm is situated at such a distance from the beater drum 10 that cobs of maize which approach the breast in a favourable position for shelling pass without interruption, whereas cobs which tend to enter with their small ends foremost between the drum and breast strike with these small ends against the breast. The beater drum is not rough enough to force a maize cob in the husk past the rough breast. Moreover, the husk protects the maize that it covers, so that an agent is required to turn the cobs sideways and to assist those cobs which remain stationary to enter the shelling mechanism in a favourable position. The worm 12 is a satisfactory agent. Its function is to turn every cob that tends to enter end foremost into a favourable position for shelling. The most favourable position is with the axis of the cob inclined and the beater bars 11 are inclined or helical to assist this action, that is, to roll the cobs against the rough breast sections 1 at the desirable inclination.

Too slight an inclination leaves the tips of the cobs improperly shelled, while too great an inclination damages the cores of the cobs, which results in difficulties in the final separation of grain from the broken cobs. Inclinations found to be successful vary from two to two and a half in seven, the latter inclination being that approximately indicated by the beater bars in Figure 4. A less abrupt inclination may give good results when the diameter of the beater drum is less than 16 inches. The correct inclination naturally varies with the diameter of the drum.

A screen of bars 15 below the beater drum assists in the separation of cores from grain. Any grain which may still adhere to the cores is rubbed off in passing over these bars. The bars may be of square and/or round section and the screen may be adjustable relatively to the beater drum.

The sheller described has a breast which is rougher than the beater drum and the maize cobs are rolled against a rough breast, but so that neither the grain nor the cores of the cobs are unduly damaged. The independently movable breasts enable complete shelling to be effected with a comparatively light spring pressure and comparatively small power is required to drive the apparatus as there is no appreciable power lost in shredding up husks or breaking cores as is common in many maize shellers.

I claim:—

1. A beater drum mechanism comprising a beater drum mounted for rotation, a shaft supported in parallelism to the axis of the drum, a plurality of independent breast sections swingingly supported at one end on said shaft and depending therefrom at right angles to the axis of the drum and for cooperation with the surface of the drum, a bar mounted below the shaft, means whereby the bar may be adjusted relative to the axis of the drum, and means carried by the bar and cooperating with each of the breast sections for supporting the sections in independent yieldable relation with respect to the drum.

2. A beater drum mechanism comprising a beater drum mounted for rotation, a shaft supported in parallelism to the axis of the drum, a plurality of independent breast sections swingingly supported at one end on said shaft and depending therefrom at right angles to the axis of the drum and for cooperation with the surface of the drum, a bar mounted below the shaft, means whereby the bar may be adjusted relative to the axis of the drum, means carried by the bar and cooperating with each of the breast sections for supporting the sections in independent yieldable relation with respect to the drum, said means including rods connected to the breast sections and passing through the bar, and springs of different strengths encircling the rod on opposite sides of the bar, one of said springs being adjustable as to tension.

3. A beater drum mechanism comprising a beater drum mounted for rotation, a shaft supported in parallelism to the axis of the drum, a plurality of independent breast sections swingingly supported at one end on said shaft and depending therefrom at right angles to the axis of the drum and for cooperation with the surface of the drum, a bar mounted below the shaft, means whereby the bar may be adjusted relative to the axis of the drum, means carried by the bar and cooperating with each of the breast sections for supporting the sections in independent yieldable relation with respect to the drum, said means including a spring of predetermined tension bearing between the bar and breast sections and acting to normally move the breast sections toward the drum, a nut adjustable on the terminal of the rod beyond the bar, and a second spring of less tension than the first mentioned spring bearing between the bar and said nut, the adjustment of the second spring limiting the influence of the first mentioned spring to move the breast sections toward the drum.

In testimony whereof I have signed my name to this specification.

GEORGE CLIFTON OAKES.